US011143195B2

(12) United States Patent
Isaacs et al.

(10) Patent No.: US 11,143,195 B2
(45) Date of Patent: Oct. 12, 2021

(54) MACHINE AND PROCESS FOR FILTERLESS WET REMOVAL OF PARTICLES FROM AND HUMIDIFICATION OF AIR

(71) Applicant: Isaacs Hydropermutation Technologies, Inc., Blackfoot, ID (US)

(72) Inventors: Blake L. Isaacs, Pocatello, ID (US); Cody Christopher Race, Pocatello, ID (US); Boyd Kent Rowe, Pocatello, ID (US)

(73) Assignee: Isaacs Hydropermutation Technologies, Inc., Pocatello, ID (US)

( * ) Notice: Subject to any disclaimer, the term of this patent is extended or adjusted under 35 U.S.C. 154(b) by 219 days.

(21) Appl. No.: 16/180,745

(22) Filed: Nov. 5, 2018

(65) Prior Publication Data

US 2019/0145422 A1    May 16, 2019

Related U.S. Application Data

(60) Provisional application No. 62/581,963, filed on Nov. 6, 2017.

(51) Int. Cl.
*F04D 29/22* (2006.01)
*B01D 45/12* (2006.01)
(Continued)

(52) U.S. Cl.
CPC ......... *F04D 29/2216* (2013.01); *B01D 45/12* (2013.01); *B01D 47/10* (2013.01);
(Continued)

(58) Field of Classification Search
CPC ........ B01D 53/78; B01D 45/12; B01D 47/10; B01D 2247/101; B01D 2247/04;
(Continued)

(56) References Cited

U.S. PATENT DOCUMENTS 3,379,422 A    4/1968 Liesenhoff
4,569,632 A    2/1986 Gray, III
(Continued)

FOREIGN PATENT DOCUMENTS

CN    103161755    6/2013
CN    105709547    6/2016
(Continued)

OTHER PUBLICATIONS

European Patent Office supplementary search report to EP 18 87 3922 (Year: 2021).*

*Primary Examiner* — Stephen Hobson
(74) *Attorney, Agent, or Firm* — Hawley Troxell Ennis & Hawley LLP; Rivkah Young

(57) ABSTRACT

An improved air scrubber has an improved, more efficient, more robust impeller and impeller housing for mixing incoming air with water, scrubbing the air with increased efficiency and lower mean time between failures. Also water flow through the system is improved to prevent loss of scrubbing performance and to reduce user workload. In addition to these improvements, the water intake system has been redesigned to use less water, prevent using too much water, and to prevent previously common errors that require users to drain water from the impeller housing.

10 Claims, 9 Drawing Sheets

(51) Int. Cl.

| | |
|---|---|
| *F24F 6/16* | (2006.01) |
| *B01D 53/78* | (2006.01) |
| *F04D 17/10* | (2006.01) |
| *F04D 29/28* | (2006.01) |
| *F04D 29/70* | (2006.01) |
| *F04D 29/30* | (2006.01) |
| *F04D 29/44* | (2006.01) |
| *F04D 23/00* | (2006.01) |
| *B01D 47/10* | (2006.01) |
| *F24F 6/00* | (2006.01) |
| *F24F 8/117* | (2021.01) |

(52) U.S. Cl.
CPC ............ *B01D 53/78* (2013.01); *F04D 17/10* (2013.01); *F04D 23/006* (2013.01); *F04D 29/281* (2013.01); *F04D 29/30* (2013.01); *F04D 29/441* (2013.01); *F04D 29/705* (2013.01); *F24F 6/16* (2013.01); *B01D 2247/04* (2013.01); *B01D 2247/101* (2013.01); *B01D 2252/103* (2013.01); *B01D 2257/91* (2013.01); *B01D 2258/06* (2013.01); *F05D 2210/13* (2013.01); *F05D 2210/42* (2013.01); *F05D 2240/30* (2013.01); *F05D 2250/52* (2013.01); *F24F 8/117* (2021.01); *F24F 2006/008* (2013.01)

(58) Field of Classification Search
CPC .......... B01D 2258/06; B01D 2252/103; B01D 2257/91; F24F 6/16; F24F 8/117; F24F 2006/008; F04D 17/10; F04D 27/705; F04D 29/30; F04D 29/2216; F04D 29/441; F04D 23/006; F04D 29/281; F04D 29/705; F05D 2250/52; F05D 2240/30; F05D 2210/13; F05D 2210/42; F05D 2250/131; Y02A 50/20

See application file for complete search history.

(56) References Cited

U.S. PATENT DOCUMENTS

| | | | |
|---|---|---|---|
| 4,594,081 A | 6/1986 | Kroll et al. | |
| 6,110,246 A * | 8/2000 | Eubank | B01D 45/14 55/394 |
| 6,238,184 B1 * | 5/2001 | Giribaldi | F04D 29/326 416/189 |
| 6,241,474 B1 | 6/2001 | Alizadeh et al. | |
| 6,340,291 B1 * | 1/2002 | Reckert | F04D 29/284 416/185 |
| 10,566,875 B2 * | 2/2020 | Camilleri | F03B 17/061 |
| 2007/0051245 A1 * | 3/2007 | Yun | B01D 47/10 96/281 |
| 2009/0297344 A1 | 12/2009 | Hill et al. | |
| 2013/0224004 A1 * | 8/2013 | Radhakrishnan | F04D 29/444 415/191 |
| 2014/0119922 A1 | 5/2014 | Nakano et al. | |
| 2015/0020684 A1 * | 1/2015 | Isaacs | A23L 3/34095 95/185 |
| 2018/0361288 A1 * | 12/2018 | Nie | B01D 45/06 |

FOREIGN PATENT DOCUMENTS

| | | | |
|---|---|---|---|
| EP | 0947704 | 10/1999 | |
| EP | 1 669 610 | 6/2006 | |
| EP | 1669610 A1 * | 6/2006 | ........... F04D 29/326 |
| GB | 1 329 277 | 9/1973 | |
| WO | WO 2017/097183 | 6/2017 | |

* cited by examiner

MACHINE AND PROCESS FOR FILTERLESS WET REMOVAL OF PARTICLES FROM AND HUMIDIFICATION OF AIR

RELATED APPLICATIONS

This application claims priority to Isaacs, et al., U.S. Provisional Patent Application No. 62/581,963, filed on Nov. 6, 2017, entitled "HUMIGATOR SYSTEM," which is herein incorporated by reference in its entirety as if it were fully set forth herein.

BACKGROUND

Harvested potatoes and other harvested crops are often and typically stored by growers or their customers for months after harvest before being processed or sold into produce markets. These crops are susceptible to many diseases and to shrinkage while in storage. Some of the worst of these diseases, including for example *Helminthosporium solani*, commonly known as "Silver Scurf", are molds. Molds, by definition, primarily spread through the air. Growers often apply peracetic acid compounds or other fungicides to limit the spread of these molds. These mitigation methods are not always effective, and certified organic growers cannot use them. Moreover, there is risk that the molds will evolve to be more resistant to the fungicides or that the fungicides themselves will be found to be unhealthy for consumers and banned by agencies such as the United State Food and Drug Administration. Growers have needed better tools for fighting these molds.

To limit shrinkage and preserve freshness, storage facilities implement various air humidification methods. Humidity levels of higher than 95% RH are ideal and common. These humidification methods have included evaporative cooling panels, centrifugal spin plate sprayers, and various misters or foggers. There are problems with these types of humidifiers. They use a tremendous amount of water, often up to hundreds of gallons per hour in one storage facility though cold storage air can only hold a few gallons at humidity saturation or dew point. Worse than wasting water, these methods wet floors, walls, and other surfaces. Wet surfaces are conducive to mold growth, exacerbating the mold problems in storage. These conventional methods also spray many sizes of water droplets into the storage facility air. Storage facilities generally are designed to recirculate air through the stored crops. Water droplets can be small enough to stay airborne in high velocity air, but too large to stay airborne when the air velocity decreases as the air moves through the stored crops, thus wetting the surfaces of the crops and thereby increasing the risk of disease spread. While it is possible to achieve ideal humidity levels with conventional methods, growers have needed better tools for humidifying storage air. Specifically, they have needed ideal humidity using less water and without exacerbating mold growth.

The invention of the Humigator, a new type of air scrubber, gave growers a new tool for both fighting the spread of airborne disease and for humidifying with significantly less water. Invented in 2005 and described in U.S. Pat. No. 6,905,537, and brought to market in 2009, Humigation is now deployed in multiple growing regions in North America. U.S. Pat. No. 9,265,267, issued in early 2016, added to and improved this prior art air scrubber. This air scrubber, named the Humigator, is a machine and process for filterless wet removal of particles from air, comprised of a suction inlet pipe for drawing particle laden air and fluid (usually water) simultaneously into an impeller for atomizing fluid droplets, an impaction anvil or specialized impeller housing to splatter atomized droplets into smaller droplets and to create multi-staged low pressure Venturi zones to cause and enhance containment of particles within the fluid, a demisting or separation chamber and method of discharging particle laden fluid that separates fluid from air, discharging particle laden fluid down a drain and discharging cleaned and humidified air back into the original space. It uses less than about 10 gallons of water per hour to clean and humidify storages buildings of up to 5,000 ton capacity. Humigation delivers ideal humidity of up to 100% relative humidity while reducing water usage by typically over 80% relative to conventional or previous methods. The original air scrubber design, while very effective, required or could benefit from multiple substantive improvements. These improvements areas include:

Scrubbing Efficacy. Section 2.3 of EPA Publication 340/1-83-022 (Busik and Foster) describes an approximate linear relationship between air pressure drop in a Venturi wet scrubber and scrubbing performance in terms of measured emissions. This principle is the foundation of the multiple Venturi zone prior art air scrubber as described in U.S. Pat. No. 6,905,537. Early versions of the impeller component of the prior art air scrubber, as described in U.S. Pat. No. 6,905,537, were built in multiple sizes, all with a depth-to-diameter ratio of approximately 0.2, specifically the model 1225 prior art air scrubber with a 2.5" depth×12" diameter, and the model 1835 prior art air scrubber with a 3.5" depth×18" diameter.

Impeller reliability: More than 100 impellers of this prior art configuration described in U.S. Pat. No. 6,905,537 were built and have been deployed in the field. These systems have proven to work, but approximately 15% of these have failed within 3 years, and the failure rate is higher for the larger sizes. An improved design was needed to make the impellers more reliable.

Limitations on Captured Pathogen Capacity: The prior art air scrubber implements a cyclone separation tank that accumulates water into which captured particles accumulate. This water is then recycled through the Venturi or mixing chamber and back into the separation tank, from where it is periodically drained, discarded, and then replaced with fresh water. Idaho State University's Microbiology Lab has tested the prior art air scrubber's ability to capture microbes. This testing has repeatedly shown that the prior art air scrubber captures and holds approximately 10,000 bacteria (benign *E. Coli*) per milliliter and/or approximately 1,000 simple yeast spores per milliliter of stored and recirculated water at its limit. At these saturation points, the data suggest that the prior art air scrubber re-aerosolizes as many bacteria and spores as it captures. In an atmosphere rich in microscopic organic particles, this limit is reached in less than three hours of continuous operation, approximately as shown in FIG. 9. These data suggest that while the prior art air scrubber does capture very high numbers of bacteria and spores, and that it does kill many of them as they pass through a UV element in the water recirculation system, in a pathogen rich atmosphere it begins to lose net capture efficiency fairly quickly because it recycles its water and continues to use that recycled water to capture more bacteria and/or mold spores. To prevent this efficiency loss, the user or customer must drain the recycled water as often as once daily or more. This puts a workload on the customer and limits the performance of the prior art air scrubber.

Elimination of water spray: U.S. Pat. No. 9,265,267 describes a prior art air scrubber cyclone separation chamber that is optimized for accumulation of water for recycling through the Venturi chamber. Because the prior art air scrubber must store fluid in its demister or separation tank, this demister is limited as a second stage to the air scrubbing function of the prior art air scrubber. It also allows a small amount of excess water spray to exit the prior art air scrubber with the cleaned and humidified exit airstream. While still using significantly less water than conventional humidifiers, this was still not perfect in terms of eliminating all overspray and minimizing water usage.

Water usage limit. The prior art air scrubber, while providing for water flow adjustment, also let users adjust water flow rate into the Venturi chamber beyond an appropriate range. If the water is adjusted to be too high, the prior art air scrubber runs but it begins to lose scrubbing efficacy and it sprays a small amount of excess water from its air outlet too much like conventional humidifiers that the prior art air scrubber is meant to replace. Users are instructed to adjust the valve to prevent excessive overspray, but this creates more customer workload than necessary or ideal.

Water flow control. The prior art air scrubber requires the user to manually turn off the flow of water when turning off the prior art air scrubber by closing a valve upstream from the prior art air scrubber or by closing the valve that feeds water into the Venturi chamber. If the water supply is not turned off before the prior art air scrubber power is turned off, water accumulates in the Venturi chamber and into the air intake plumbing connected to the Venturi chamber. This creates field difficulties because when this happens, the prior art air scrubber requires an extra burst of energy to clear out this accumulated water when started. This too often causes power circuit overloads and necessitates draining of the water from the Venturi chamber before the prior art air scrubber can be restarted, again more than necessary workload for the customer.

SUMMARY OF THE INVENTION

An improved air scrubbing system includes an improved impeller mounted within a correspondingly improved impeller housing, the impeller configured to cause air entering the impeller housing which enters through an intake in a first direction to be driven towards and exit into an air channel in a second direction.

In one embodiment, the impeller is configured with eight or more blades each having a first end and a second end, each first end being coupled to a central hub at positions which together define a circle having a center at the axis of rotation, each position being at equal distances away from each other position around the hub.

In one embodiment, each blade is positioned in a plane of rotation around the axis of rotation and positioned to rotate in a same plane orthogonal to the axis of rotation.

In one embodiment, a fresh water supply is configured to be provided to the intake of the impeller housing. In one embodiment, the water is recycled through the improved air scrubbing system, but refreshed periodically depending on an amount of light measured at a turbidity sensor which looks at a percentage amount of light that passes through a representative sample of the water supply.

As the percentage of light passing through the water decreases, the efficiency of the water decreases, making it beneficial to drain at least a portion of the recycled water from the system, replacing at least a portion of the drained water with fresh water from an external source.

In one embodiment, the improved air scrubbing system is configured to at least partially, or completely, drain periodically, i.e. hourly, every two, three, or four hours, every day, or every two, three or four days. In one embodiment, the improved air scrubbing system is configured to at least partially, or completely, drain, at least partly based on predetermined levels of light measured by the turbidity sensor.

In one embodiment, a separation tank is configured to receive an air-water mixture from the air channel, the separation tank further having a drain.

In one embodiment, each impeller blade is curved. In one embodiment, each impeller blade is curved in a plane orthogonal to the axis of rotation of the impeller.

In one embodiment, each blade is curved in a diminishing radius from the first end of the blade to the second end of the blade, with the radius being determined as a distance from the axis of rotation.

In one embodiment, a mathematical curve defining the diminishing radius is defined by an equation having exponential variables, e.g. having one or more squared variables or one or more variables having higher exponents, or both.

In one embodiment, a water supply flow rate is limited by causing the water to pass through a pressure limiting valve or pressure regulator and then through an orifice prior to the impeller intake. In one embodiment, the water supply enters the orifice at or near the impeller intake and only a predetermined maximum amount of water passes through the orifice, the amount of water being controlled by a pressure limiting valve and an inside diameter of the orifice.

In one embodiment, the water supply is configured to only be supplied to the intake when a motor coupled to the impeller is in an active state. Thus, water is allowed to flow from the water supply into the impeller intake while the impeller is turning, but not after power is removed from the motor coupled to the impeller.

In one embodiment, a first end curvature angle formed in a plane orthogonal to the axis of rotation of the impeller at the first end of any blade is between 75 and 105 degrees, wherein a curvature angle of the blade measured at any given point on a given blade is the curvature of the given blade at the given point relative to a tangent line of a circle passing through the given point, the circle being centered on the axis of rotation of the improved impeller.

In one embodiment, the first end curvature angle is 90 degrees.

In one embodiment, the diameter of the impeller is between six and thirty inches.

In one embodiment, the width of the impeller is between one-half inch and four inches.

In one embodiment, the impeller has sixteen blades.

Focusing on the impeller itself, an article of manufacture is an improved impeller including a central hub having an axis of rotation. When the impeller is coupled with a motor attached to the axis of rotation at the central hub, the blades of the impeller rotate In one embodiment, the improved impeller further includes eight or more blades each having a first end and a second end.

In one embodiment, each first end is coupled to the hub at positions which together define a circle having a center at the axis of rotation, where adjacent coupling positions are at equal distances away from each other coupling position around the hub.

In one embodiment, each blade is positioned in a plane of rotation orthogonal to the axis of rotation.

In one embodiment, the improved impeller has a width and a diameter, where the diameter is defined as straight-line distance from the axis of rotation to the second ends of the blades when the blades are rotated in a plane of rotation perpendicular to the axis of rotation.

In one embodiment, the width is defined as a width of each blade parallel to the axis of rotation. In one embodiment, the blades each have the same width to diameter ratio. In one embodiment, the width to diameter ratio is between 0.09 and 0.125.

In one embodiment, each impeller blade is curved.

In one embodiment, each impeller blade is curved in a diminishing radius from the first end to the second end.

In one embodiment, a mathematical curve defining the diminishing radius is exponential.

In one embodiment, a first end curvature angle formed in a plane orthogonal to the axis of rotation of the impeller at the first end of any blade is between 75 and 105 degrees, wherein a curvature angle of the blade measured at any given point on a given blade is the curvature of the given blade at the given point relative to a tangent line of a circle passing through the given point, the circle being centered on the axis of rotation of the improved impeller.

Figure 1:
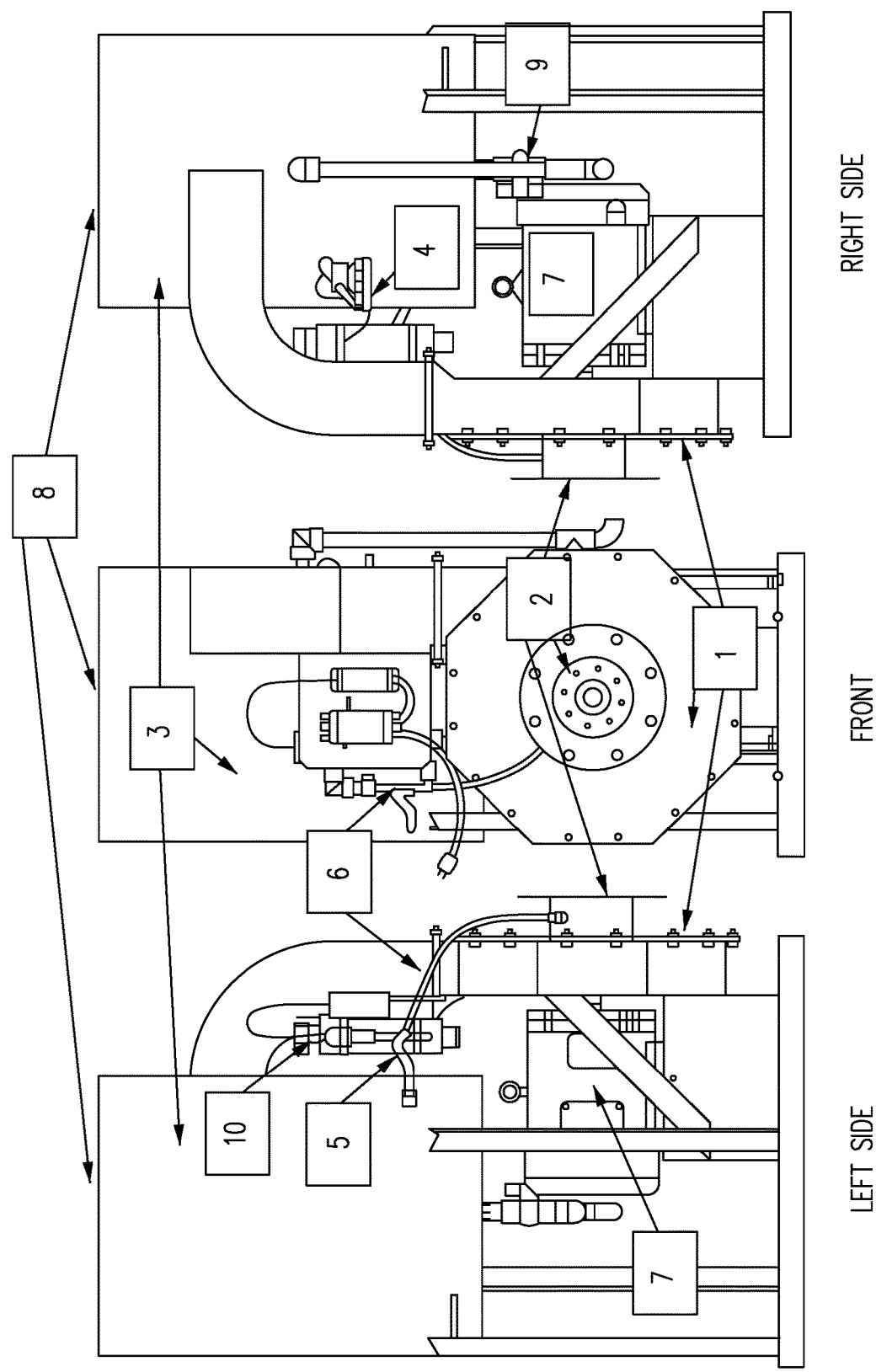
FIG. 1 depicts a prior art air purification system, according to one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

FIG. 1 depicts a prior art air scrubbing system, according to one embodiment. A prior art air purification system includes a impeller housing 1, an air intake 2, a separation tank 3, a solenoid valve water source inlet 4 which connects to a common garden hose or other water source, water recirculation tubing and structure 5, mixing chamber water line 6, motor 7, and air outlet 8. The prior art air scrubbing system implements separation tank 3 that accumulates water into which captured particles accumulate. This water is then recycled through water recirculation tubing and structure 5, then through UV element 10, through impeller housing 1 and back into separation tank 3, where it is periodically drained through discharge valve 9, discarded, and then replaced with fresh water as needed through solenoid valve water source inlet 4. UV element 10 helps to kill bacteria and denature mold spores in the recirculating water.

Figure 2:
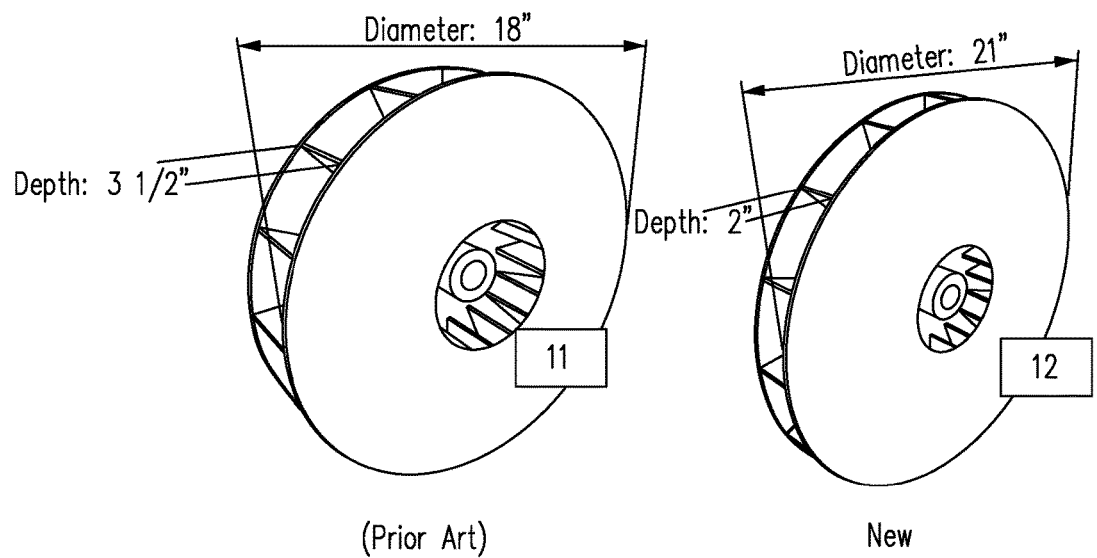
FIG. 2 is a comparative depiction of a prior art and a new impeller, according to one embodiment.

FIG. 2 is a comparative depiction of a prior art and a new impeller, according to one embodiment.

Referring to FIG. 2, prior art impeller 11, typically installed within impeller housing 1 of FIG. 1, has a depth-to-diameter ratio of approximately 0.2 which worked well empirically both in terms of air scrubbing and air flow. New impeller 12 is an improved impeller design with a 2" depth×21" diameter. This is a depth-to-diameter ratio of approximately 0.1. According to various embodiments, a depth to diameter ratio of 0.09 and 0.125 provide for optimal air scrubbing.

Figure 3:
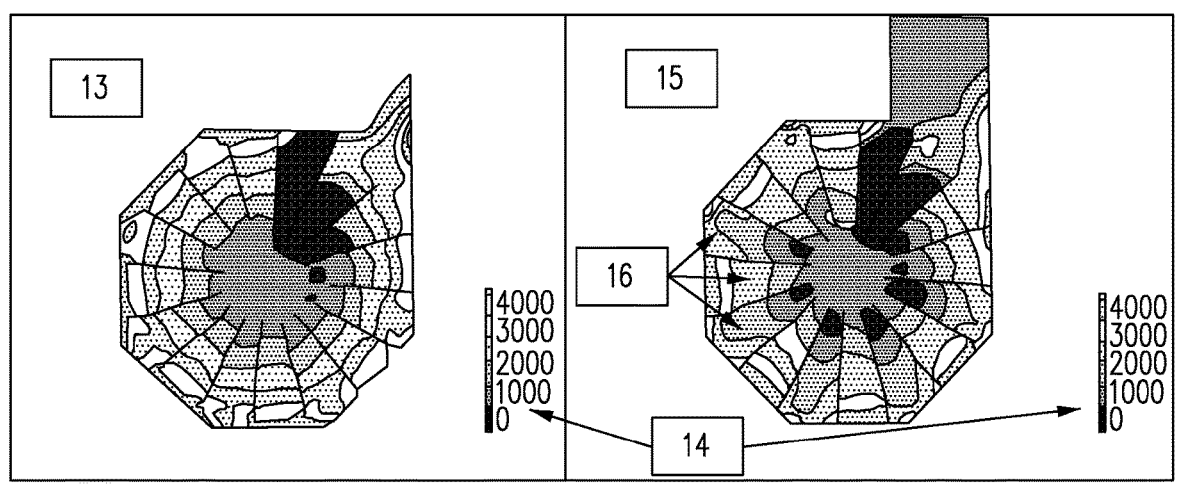
FIG. 3 is a Comparative CFD Analysis of 18" Impellers; 3.5" Depth and 2.0" Depth, according to one embodiment.
Figure 4:
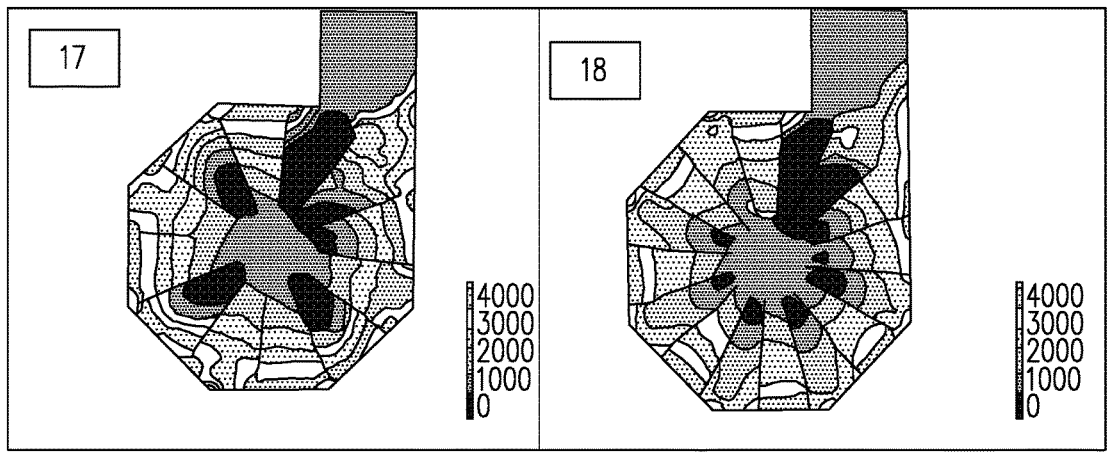
FIG. 4 is a Comparative CFD Analysis of 2" depth, 18" Impellers; 12-blade vs 16-blade, according to one embodiment.
Figure 5:
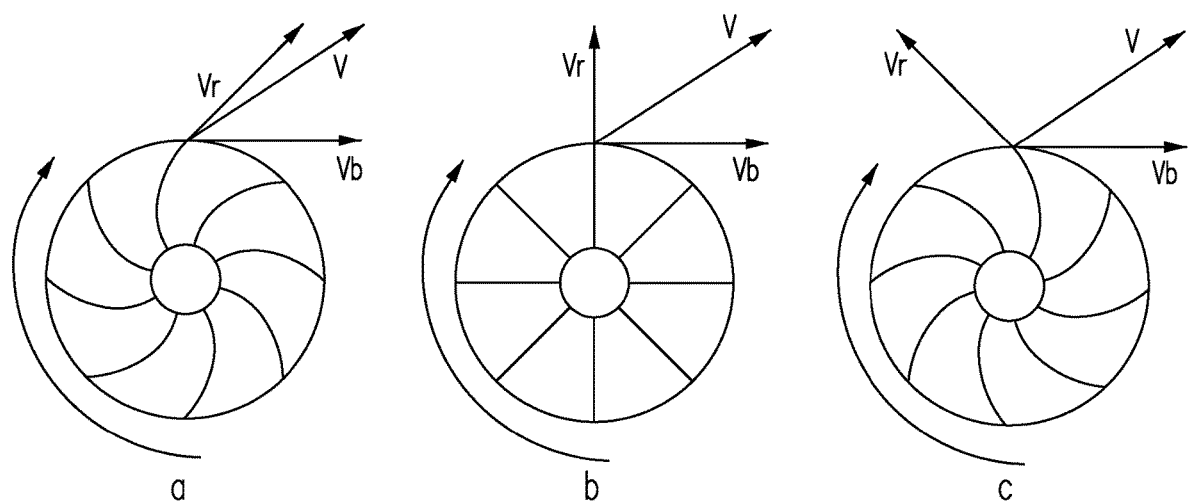
FIG. 5 depicts prior art Radial Impeller Blade Types, according to one embodiment.

FIG. 3 is a Comparative CFD Analysis of 18" Impellers; 3.5" Depth and 2.0" Depth, according to one embodiment.

Referring to FIG. 3, Computational Fluid Dynamics (CFD) analysis was run on prior art impeller 11 of FIG. 2, with FIG. 3 graphically depicting how these pressures vary as the impeller spins inside impeller housing 1 of FIG. 1.

As can be seen from pressure scale legends 14 of CFD analyses 13 and 15 in these plots, the color gradients depict pressure changes. This analysis confirmed that the prior art impeller and housing system does create multiple Venturi (low pressure) zones. It also showed opportunity to increase the pressure fluctuations or the distinctiveness and relative magnitude of these zones by decreasing the depth of the impeller. This CFD analysis was run on 18" diameter impellers with depths of 1", 1.75", 2", 2.25", 2.5", 3", and 3.5". Of these, the 2" impeller depth as depicted in FIG. 2 showed the highest increase in pressure variation in FIG. 3. Further refinement of these analyses showed optimal pressure fluctuations for impellers with width-to-diameter ratios of between 0.9 and 0.125 for impellers with diameters between 15" and 24".

The relative pressure scale for the FIG. 3 plots is (4500 to −520 Δp/p). The dark black areas represent values higher than 4500 and the white represents values lower than −520. Residual plots for the simulations are very similar, confirming that the relative pressure differentials can be directly compared between the two plots.

As can be seen from FIG. 3, the 2" depth impeller creates significantly larger and more rapidly changing pressure fluctuations over smaller distances 16. Pressure in each impeller cavity (space between fan blades) increases and then decreases as the fan turns in the housing. These increased and more rapid pressure fluctuations in the impeller housing improve mixing or particle capture performance because they distort water droplets and cause them to more rapidly change direction, increasing the incidence of contact between the droplets and airborne particles, especially in locations of highest air velocity and correspondingly lowest pressure, or venturi zones. This is because lower air pressure decreases the surface tension on the water droplets, reducing the droplet and particle momentum necessary to cause wetting collisions between droplets and airborne particles.

Prototypes of the new improved air scrubber with a 10 horsepower, 3500 RPM electric motor 7 directly coupled to the impeller with these impeller and housing configurations were then built and tested. It was found that the narrow impeller and housing was not only better for air scrubbing, but was also slightly more efficient as a blower. The 2.0" design moved nearly as much air but also used less power as shown here in Table 1.

TABLE 1

Impeller power consumption and air flow

| | 18" Diameter | | 21" Dia |
|---|---|---|---|
| | 3.5" Impeller Depth | 2.0" Impeller Depth | 2.25" Impeller Depth |
| Power Consumption (Watts) | 5,854 | 5,168 | 6.035 |
| Airflow (CFM) | 2635.6 | 2662.1 | 3,487 |

With this increased efficiency it became possible to increase the diameter of the impeller from 18" to 21" (and increasing the depth from 2.0" to 2.25" respectively) while still using the same 10 Horsepower (7,500 Watt) motor, further increasing the airflow for yet more performance without adding significant cost to the improved air scrubber. Since it both improves scrubbing performance and increases blower efficiency, the 0.1" depth-to-diameter ratio impeller is clearly the better design.

Further CFD analysis showed opportunity to increase pressure fluctuations more with additional impeller and housing modifications.

FIG. 4 is a Comparative CFD Analysis of 2" depth, 18" Impellers; 12-blade vs 16-blade, according to one embodiment.

Referring to FIG. 4, radial blade fans are known to be suitable especially in dust laden and moist airstream applications such as those where air scrubbers would typically be used. These CFD simulations also show high pressure fluctuations and maximized Venturi zones with a radial fan blade shape. Radial fans that are optimized for airflow efficiency tend to use fewer blades than the air scrubber, typically 8 to 12 blades. The improved air scrubber impeller design includes 16 blades. As an air scrubber, its goal is to maximize pressure fluctuations without sacrificing too much airflow efficiency. A CFD simulation that compared the pressure profile of a 12 blade impeller 17 vs 16-blade impeller 18 design is shown in FIG. 4.

As can be seen graphically in FIG. 4, both the number and magnitude of the pressure fluctuations is greater with 16-blade impeller 18. A 15 inch diameter 12-blade impeller 17 was built for comparison and found to deliver higher airflow and slightly higher efficiency, but these differences are small relative the benefit of the higher magnitude and greater number of pressure fluctuations, as seen in Table 2.

TABLE 2

Power consumption and airflow for two impeller designs

| | 12 Blade 15" Diameter Impeller | 16 Blade 15" Diameter Impeller |
|---|---|---|
| Power Consumption (Watts) | 3,609 | 3,341 |
| Airflow (CFM) | 2,115 | 1,821 |

The type or general shape of impeller blade can add significant advantages to a systems design and how it functions. This is also true for the impeller in the improved air scrubber.

FIG. 5 depicts prior art Radial Impeller Blade Types, according to one embodiment.

For constant tip speed velocity impellers (which would be true for impellers of the same size) and constant air velocity, that the backward curved blade (BCB) and forward curved blade (FCB) have a higher velocity normal to the blade compared to the straight radial blade impeller b. Since a purpose of the impeller in the air scrubber is to atomize the water into extremely small droplets, a higher velocity normal to the blade is desired as it would increase the pressure variation. Since the velocity increases, the pressure decreases as the water and air mixture leave the blade; this higher velocity and pressure variation that further aids in particle wetting and capture as described above. If the discharge angle is the same for the FCB and the BCB the velocity vector of the air leaving the blade normal to the blade will have the same magnitude. There are some known advantages in the BCB that are suited more for use in the air scrubber. One of the advantages of the BCB is that it is more efficient compared to the FCB. The BCB can produce the highest velocity (lowest pressure) as the air rolls under the blade tips. In addition to the efficiency gained by the system from this, it also produces a quieter impeller.

FIG. 6 is a Curved Blade Impeller CFD Analysis, according to one embodiment.

Referring to FIG. 6, not only can pressure fluctuations be increased between impeller cavities, these fluctuations can also be increased within each impeller cavity by implementing a curved blade 21 impeller design in combination with the octagonal impeller housing 22. Various curved shapes, including constant radius, involute, and others were evaluated. A custom radius shape with radius decreasing from center to tip proved optimal. The curve of this impeller blade is logarithmic and is based on the desired discharge angle and inlet angle.

The design for the air scrubber BCB blade shape starts with an inlet angle of 90 degrees, meaning that the air enters the impeller at a 90 degree angle. The outlet angle is a range depending on the size of the air scrubber. This range varies from 15 degrees to 35 degrees. For this 21" impeller, an exit angle 23 of 25 degrees proved optimal. A logarithmic curve is then used to connect the two angles and produce a smooth and gradually curved blade 21 with decreasing radius from center to tip.

With this design, the pressure reduces again near the tip 19 of each impeller blade as it approaches the space where the gap between the blade tip and housing surface is narrowest at 20. With this impeller in combination with the octagonal shape of the impeller housing, it is possible to not only minimize pressure, but then to very suddenly maximize air pressure again as each impeller cavity passes each flat side 22 of the housing. These more abrupt pressure fluctuations and increased number of pressure fluctuations produce even more scrubbing efficacy in the air scrubber.

Figure 7:
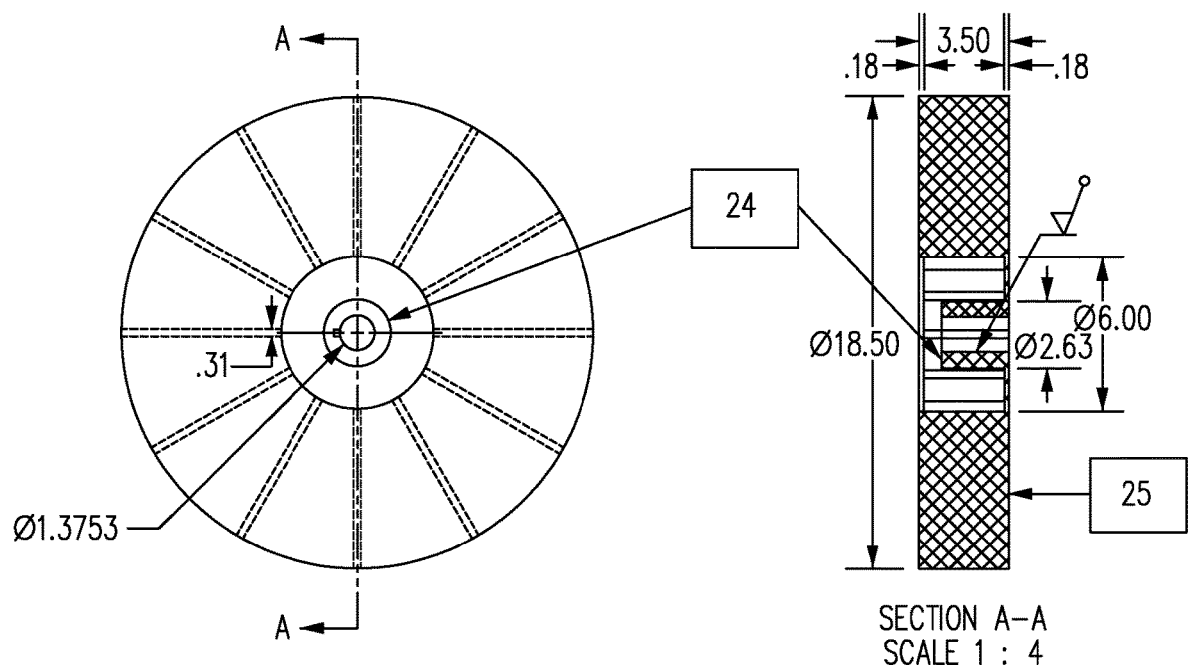
FIG. 7 depicts a Simple Hub new Impeller Design, according to one embodiment.

FIG. 7 depicts a Simple Hub new Impeller Design, according to one embodiment.

Figure 8:
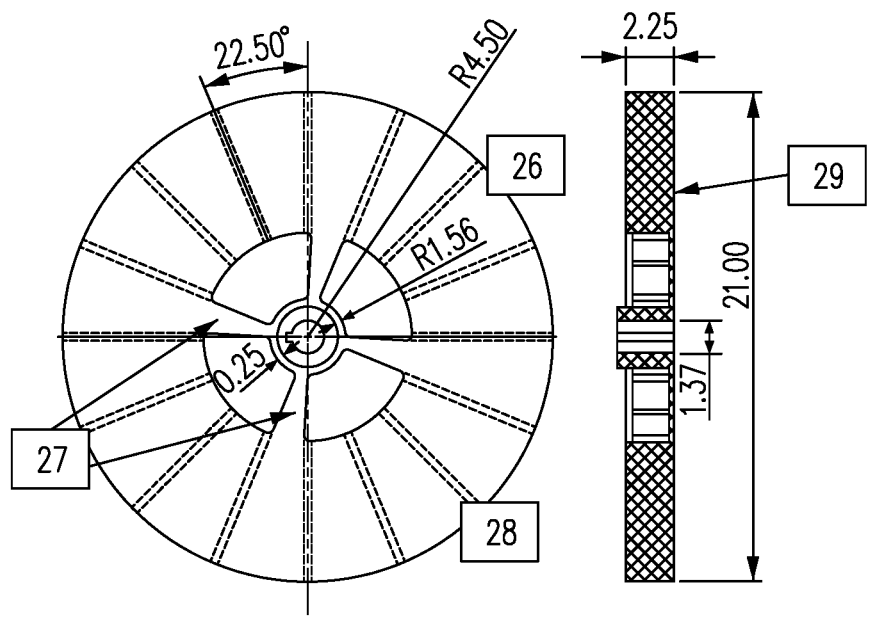
FIG. 8 depicts a Reinforced Hub new Impeller Design, according to one embodiment.

FIG. 8 depicts a Reinforced Hub new Impeller Design, according to one embodiment.

Referring to FIG. 2, FIG. 7 and FIG. 8 together, recall that the impeller and impeller housing of FIG. 2 the hub 24 of the prior art impeller is welded only to the back wall 25 of the impeller. The improved impeller design deepens hub 26 and welds it to spokes 27 on the front wall 28 as well as to the back wall 29. This improved design was built and tested for manufacturability, initial balance, and airflow. Test results show improved initial quality with no loss of performance in air flow. More than 10 of these new impellers have been deployed with no failures to date. Note that the impeller of FIG. 8 has straight blades.

Figure 9:
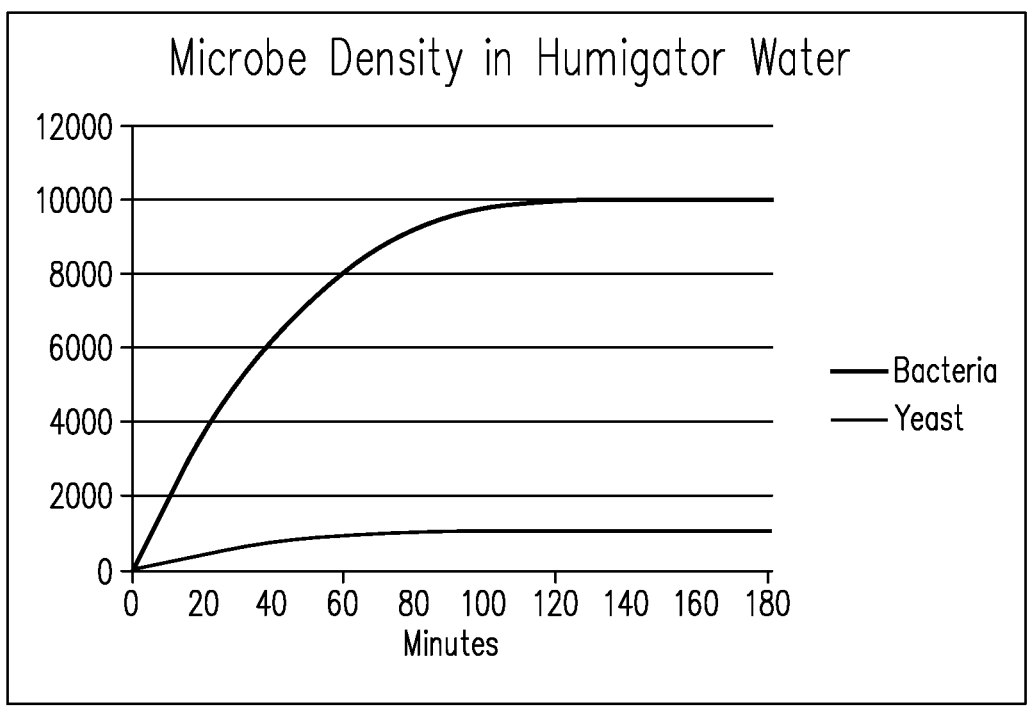
FIG. 9 is a chart reflecting Microbe Accumulation and Density in Recirculated Water, according to one embodiment.

FIG. 9 is a chart reflecting Microbe Accumulation and Density in Recirculated Water, according to one embodiment.

Referring to FIG. 9, testing has shown that the air scrubber accumulates microbes at increasing density until saturation. Prior art scrubbers operate on the steeper parts of these curves when freshly drained, but begin to lose scrubbing efficiency over time. In many instances customers have waited too long to drain a given air scrubber such that it was operating at or near particle saturation or in the flat portion of the curves, where it has lost its ability to scrub the air. The new improved air scrubber discussed herein implements a continuous flow water system. In one embodiment, water is not recirculated from the separation tank back into the impeller housing, but instead it is drained continuously.

In one embodiment, a fresh water supply is configured to be provided to the intake of the impeller housing. In one embodiment, the water is recycled through the improved air scrubbing system, but refreshed periodically depending on an amount of light measured at a turbidity sensor which looks at a percentage amount of light that passes through a representative sample of the water supply.

As the percentage of light passing through the water decreases, the efficiency of the water decreases, making it beneficial to drain at least a portion of the recycled water from the system, replacing at least a portion of the drained water with fresh water from an external source.

In one embodiment, the improved air scrubbing system is configured to at least partially, or completely, drain periodically, i.e. hourly, every two, three, or four hours, every day, or every two, three or four days. In one embodiment, the improved air scrubbing system is configured to at least partially, or completely, drain, at least partly based on predetermined levels of light measured by the turbidity sensor.

Figure 10:
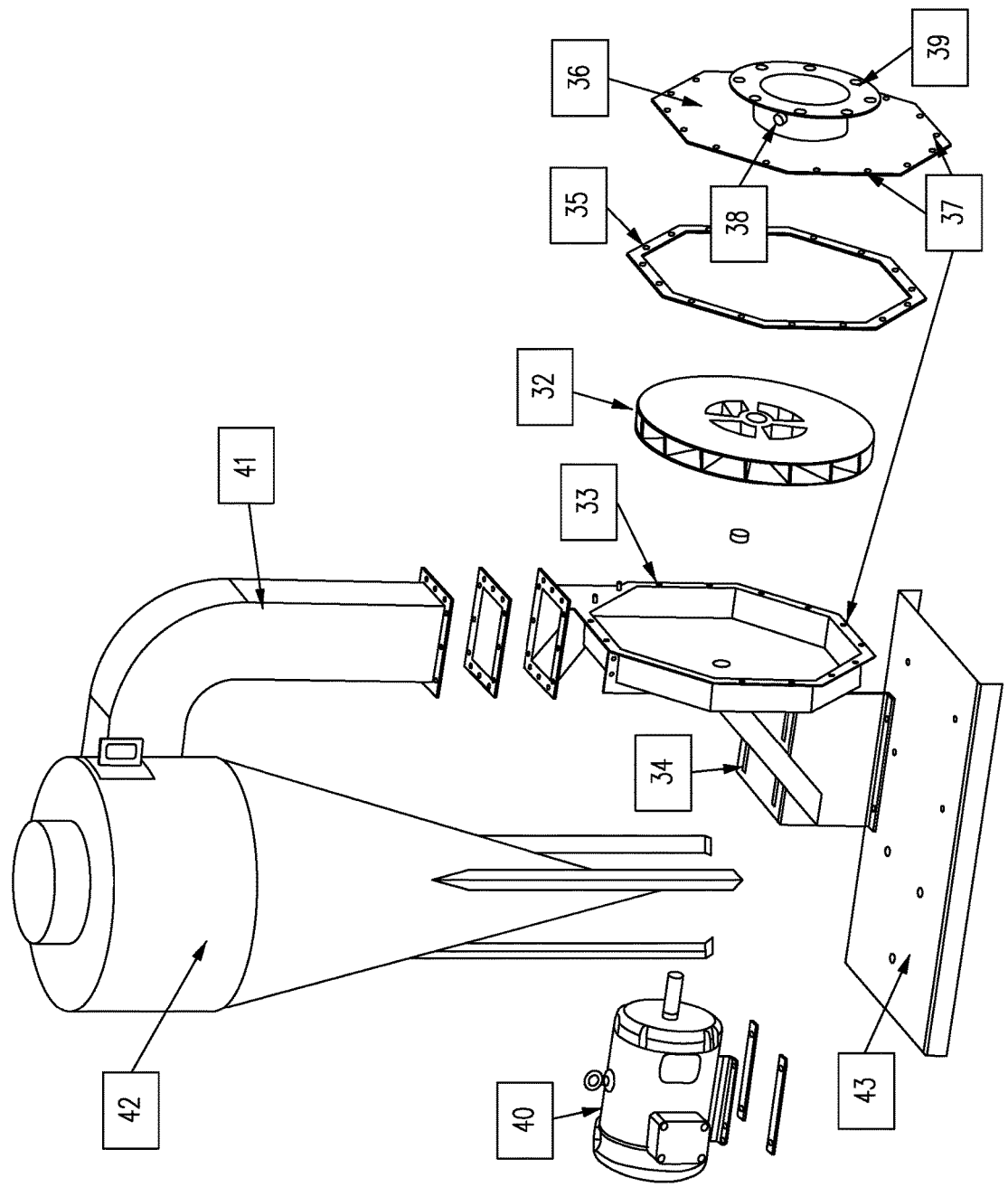
FIG. 10 is an exploded view of Venturi Scrubbing System, according to one embodiment.

FIG. 10 is an exploded view of Venturi Scrubbing System, according to one embodiment.

Referring to FIG. 10, impeller 32 is housed inside the impeller housing or mixing chamber 33 and directly coupled to the shaft of motor 40. This impeller housing is secured to motor mount 34 as a single fabricated assembly. A neoprene or other water tight seal 35 is then secured between this housing and the air intake cover plate 36 using stainless steel bolts and nylon locking nuts at areas 37. This air intake cover plate 36 implements a standard ANSI or ASME flange bolt pattern 39, typically 6 inches to 10 inches in diameter for air scrubbers sized with impeller diameters from 14 inches to 24 inches. Water enters through a ¼" NPT fitting 38. Driven by the high speed (typically 2,700 RPM to 4,000 RMP for air scrubbers sized with impeller diameters from 14 inches to 24 inches) electric motor 40, the air and water mixture is driven by the impeller up through the air channel 41 and into separation tank 42. The motor spins counterclockwise (from shaft-end view on the right end of the motor shown in FIG. 10) so that the impeller drives the air and water mixture directly up into air channel 41. The motor is secured to motor mount 34 with four sets of stainless steel bolts, washers, and locking nuts. Separation tank 42 is similarly secured to the base 43. The motor mount and impeller housing assembly is also secured to base 43 with stainless steel bolts, washers, and locking nuts.

Figure 11:
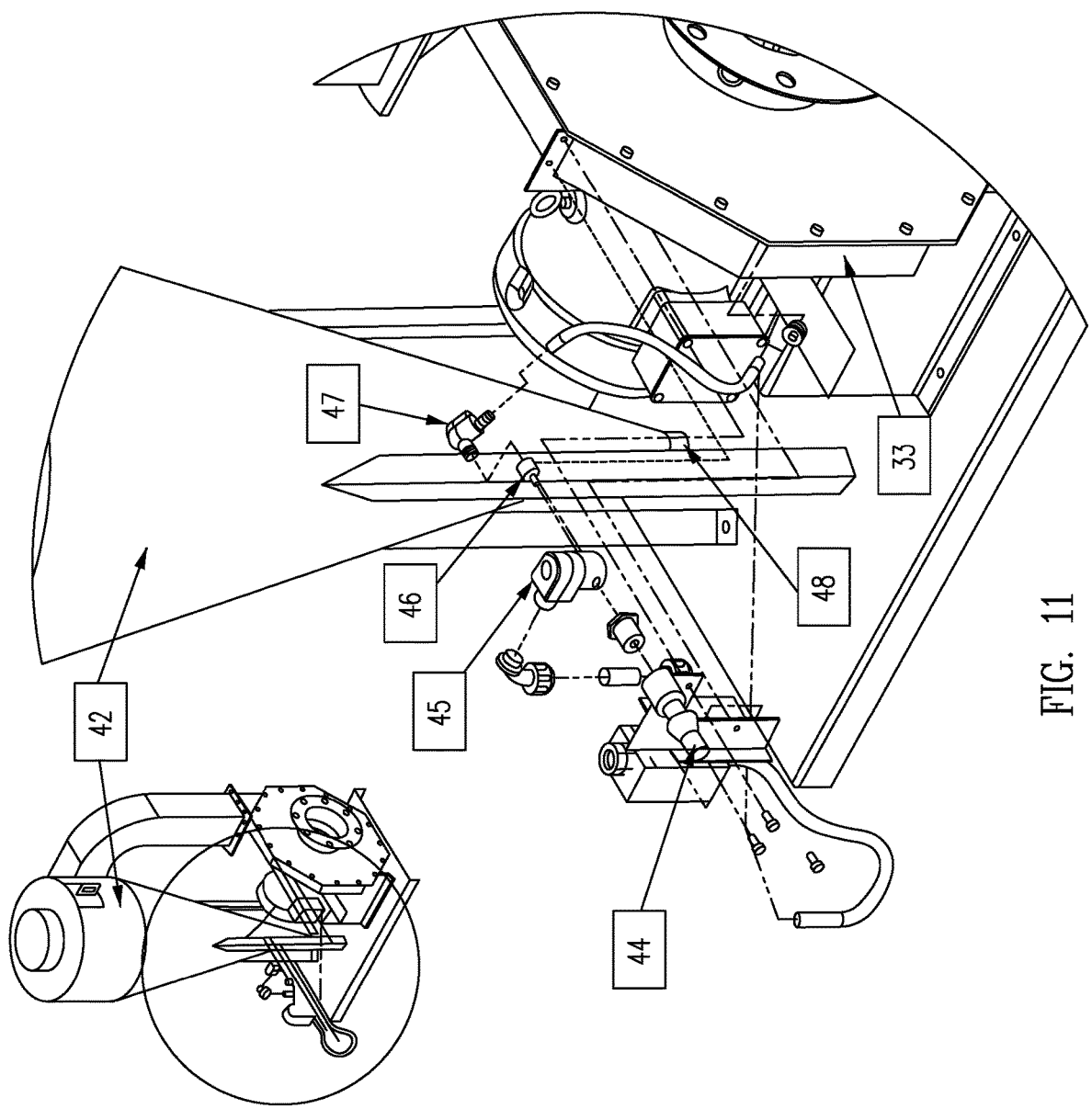
FIG. 11 is an Exploded View of Intake Water Flow and Control for an improved air scrubber, according to one embodiment.

FIG. 11 is an Exploded View of Intake Water Flow and Control for an improved air scrubber, according to one embodiment.

Referring to FIG. 11, to address the particle capture efficiency loss, a new water intake plumbing method was designed. The new design eliminates the recycled flow of the water and instead connects the Venturi chamber water intake to a fresh water source. This detail is shown in FIG. 11. Source fresh water flows from a common hose (not shown) through a pressure reduction valve 44 that limits incoming water pressure to between 10 and 20 PSI, through a solenoid valve 45 that turns flow on and off under the control of an external switch or control signal, through an orifice 46 with an opening size of typically between 0.035 inches and 0.050 inches in diameter, that limits the flow to approximately 10 to 15 GPH (gallons per hour), through a ball valve 47 that lets the user adjusts water flow up to this 10-15 GPH flow limit, and then into the Venturi chamber 33, where it is atomized and mixed with the incoming air. Water flow is limited to approximately 15 GPH to ensure that the air scrubber always operates in an optimal range for scrubbing efficacy. Higher flow rates than approximately 15 GPH begins to decrease scrubbing performance and wastes water. Letting the user adjust the water flow rate all the way to zero with the final valve 47 enables the user to limit added humidity to any desired increment over ambient humidity, while still getting some air scrubbing benefit. The external switch or control signal that opens and closes the solenoid valve 45 is controlled through standard electrical switching for motors of this type such that the solenoid valve 45 is on or open only when the motor 40 is also running. The drain valve at the bottom of the separation tank is eliminated, and water does not accumulate in the separation tank 42, but instead drains continuously through drain opening 48, which is plumbed to a hose or other drain plumbing (not shown). The addition of the solenoid valve 45 eliminates this concern by ensuring that water will only flow when the air scrubber is powered on.

The advantages of this new intake water flow design are:

1. No loss of particle-capture efficiency. The machine operates continuously on the steepest part of the Microbe Density curve above (of FIG. 9), maximizing and maintaining particle-capture efficiency.

2. Ease of operation. Users are no longer required to either drain the air scrubber or to close the valve when turning the air scrubber off or when draining it. This was a burden to users because the prior art air scrubber had to be drained as often as daily to maintain scrubbing performance. When turning water off at the valve (or feeder valve), users could not easily set the flow rate precisely as it had been set before turning it off. With the addition of the solenoid valve, users are also no longer required to close the valve (or other upstream water source valve) when the air scrubber is turned off, reducing operating workload and ensuring constant flow rate setting.

3. The water usage in this new design will vary approximately linearly with air scrubber size. This will be approximately 3 GPH for every 1000 CFM of air movement. U.S. Pat. No. 9,265,267 describes a cyclone separation chamber that is optimized for accumulation of water for recycling through the Venturi chamber. Elimination of the accumulation of water, as described above, allows for a more optimal design of this cyclone separation chamber. This improved design is shown in FIGS. 10 and 11 above, and drawn in FIG. 12 with internal detail.

Figure 12:
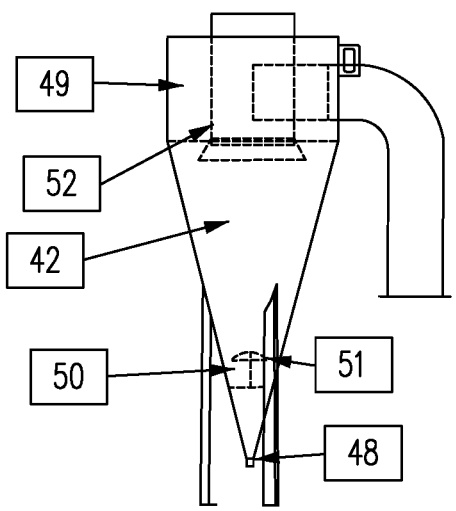
FIG. 12 is a Separation Tank of an improved air scrubber with Internal Detail, according to one embodiment.

FIG. 12 is a Separation Tank of an improved air scrubber with Internal Detail, according to one embodiment.

Referring to FIG. 11 and FIG. 12, air flows from Venturi chamber 33, into the cyclone separation tank 42. The upper cylinder 49 shapes the flow to circulate around the perimeter with the water stream and heaviest airborne particles, including larger water droplets and airborne particles, are forced to the perimeter or walls of the chamber. Pressure is highest at the perimeter, driving the water and heavier airborne particles downward to the bottom section 50 below the internal cone 51 for discharge out of the narrow bottom of the chamber 47. This internal cone 51 keeps the water and cleaned air separate as the water drains. Cleaned and humidified air separates into the center of the tank and is driven up through the center outlet tube 52 and into either open air or into an extended HVAC system.

Figure 13:
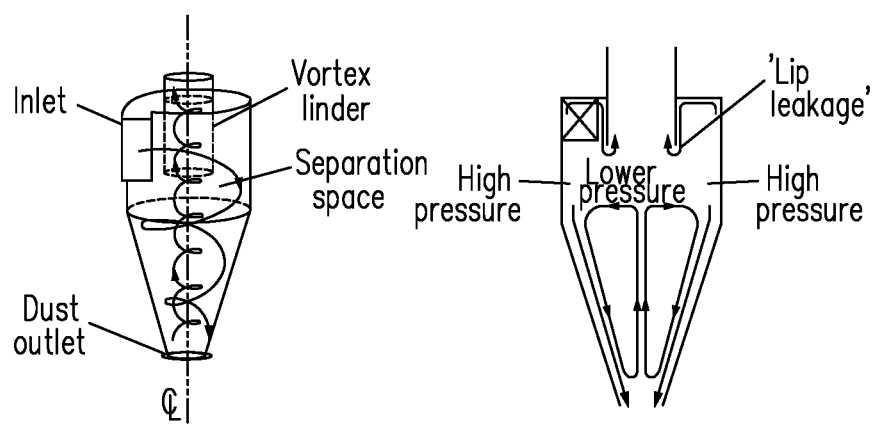
FIG. 13 depicts a prior art Cyclone Separation Tank, according to one embodiment.

FIG. 13 depicts a prior art Cyclone Separation Tank, according to one embodiment.

Versions of the type of cone-shaped cyclone separator depicted in FIG. 13 are well developed mostly for particle laden dry air streams. More rarely, they have also been used for particle laden (dirty) water-air streams. The embodiment described here and shown above is optimized to work in combination with the venturi chamber to separate water and particles from cleaned air in a combined water and air mixture. With its precise cone shape, this design creates distinct pressure zones within the tank and separates more effectively than the earlier air scrubber canister shaped separation tank.

Prototypes and production units of the new conical cyclone separator were built and tested. It was confirmed that the new design channels the flow of air and water streams as intended in the design. Water swirls downward in ribbons along the steep walls of the separator, ensuring that captured particles are even less likely to escape as the water is driven below the vortex stabilizer or internal cone 51 and down the drain. High velocity air concentrates along the sides with lower velocity air centering in the chamber and rising through and blowing upward and out through the vortex finder. It humidifies as completely and does not lose airflow.

Advantages of the new cyclone separator design:

1. It functions as an optimized second-stage air scrubber, significantly increasing the overall effectiveness and efficiency of the scrubbing performance.

2. It completely eliminates water overspray. The air exiting the air scrubber no longer contains any large (diameter of greater than 20 microns) water droplets. This more completely prevents accumulation of water on surfaces in the space where the air has been treated by the air scrubber.

3. Quieter operation. Prior art air scrubber generate high volume white noise, which is inconvenient in some applications. The improved design significantly reduces the audible noise level, enabling users to work more comfortably near the air scrubber.

Figure 6:
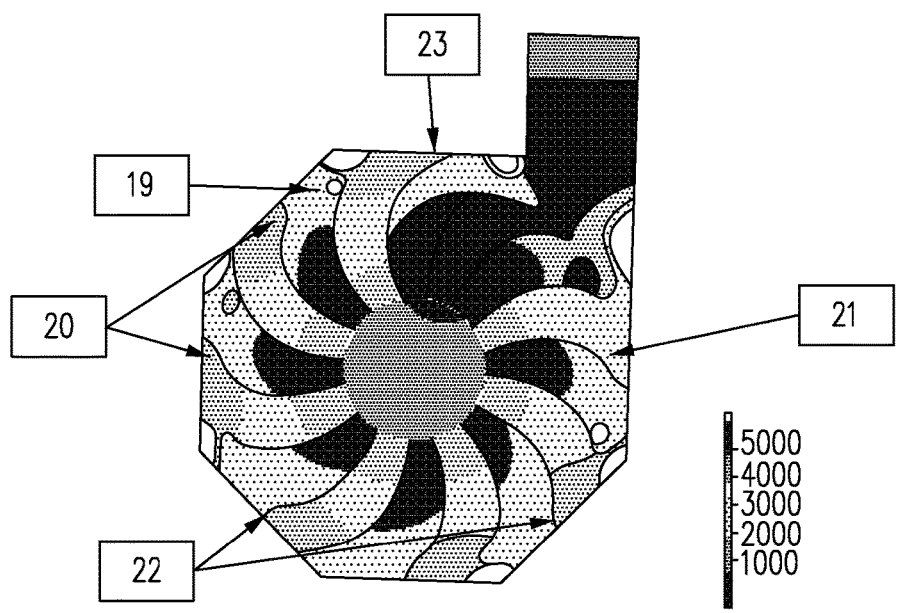
FIG. 6 is a Curved Blade Impeller CFD Analysis, according to one embodiment.
Figure 14:
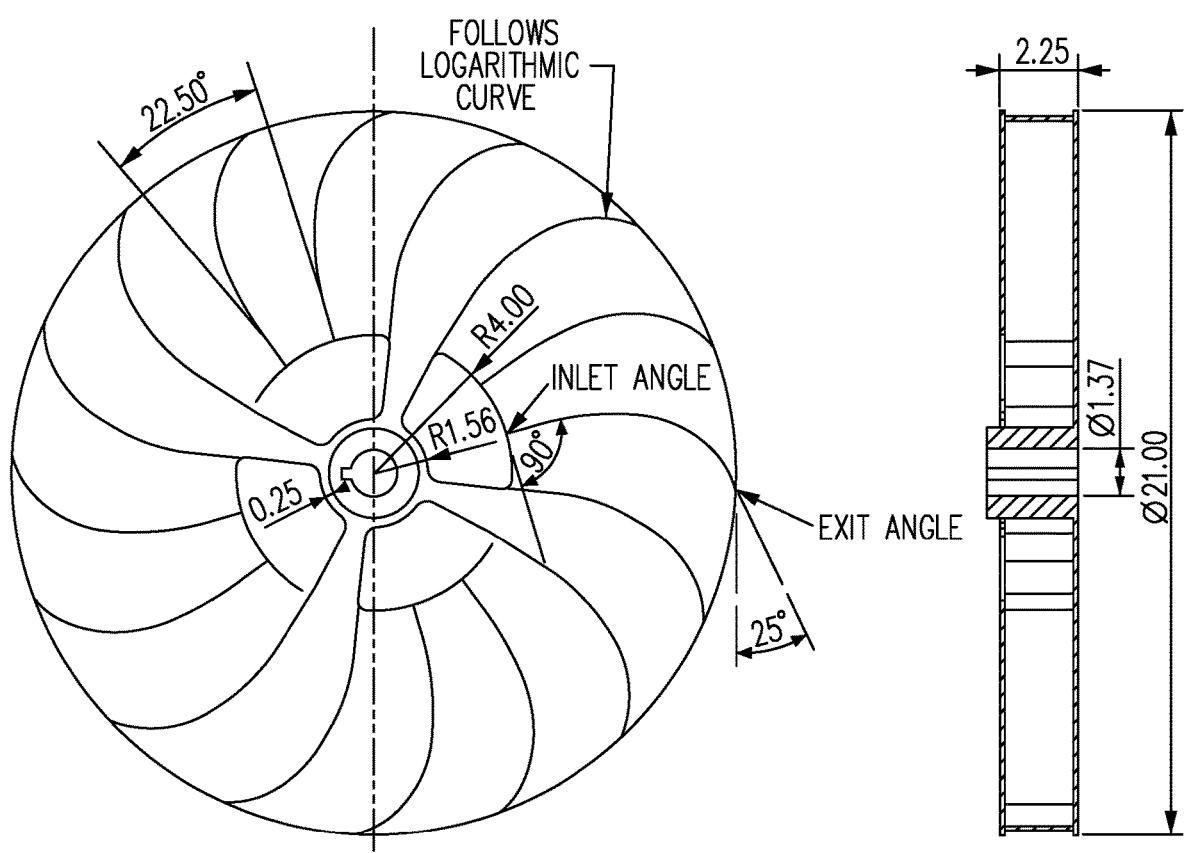
FIG. 14 depicts a Reinforced Hub new impeller design, according to one embodiment.

FIG. 14 depicts a Reinforced Hub new impeller design, according to one embodiment. Note that the impeller of FIG. 14, in contrast with the impeller of FIG. 8, has curved blades, as discussed above, for example, with respect to FIG. 6.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. An improved air scrubbing system comprising:
   an improved impeller mounted within an improved impeller housing, the impeller configured to cause air entering the impeller housing which enters through an intake at a first angle to be driven to and exit into an air channel at a second angle, the impeller comprising a central hub having an axis of rotation, wherein the impeller is configured with more than twelve blades each having a first end and a second end, each first end being coupled to the hub at positions which together define a circle having a center at the axis of rotation, each position being at equal distances away from each other position around the hub, each blade being positioned in a plane of rotation around the axis of rotation and positioned to rotate in a same plane orthogonal to the axis of rotation, further wherein:
   each blade is curved in a diminishing radius from the first end to the second end and the mathematical curve defining the diminishing radius is exponential; and
   each blade has a width and a diameter, wherein the diameter is defined as straight-line distance across a circle formed at the second ends of the blades when the blades are rotated in a plane of rotation perpendicular to the axis of rotation, and the width is defined as a width of each blade parallel to the axis of rotation wherein the blades each have a same width to diameter ratio which is between 0.09 and 0.125;

a water supply configured to be provided to the intake of the impeller housing; and a separation tank configured to receive an air-water mixture from the air channel, the separation tank further having a drain.

2. The air scrubbing system of claim 1 further wherein a water supply flow rate is regulated by an orifice the water passes through prior to the intake.

3. The air scrubbing system of claim 1 further wherein the water supply is configured to only allow water to flow to the intake when a motor coupled to the impeller is in an active state.

4. The air scrubbing system of claim 1 further wherein a first end curvature angle formed in a plane orthogonal to the axis of rotation of the impeller at the first end of any blade is between 75 and 105 degrees, wherein a curvature angle of the blade measured at any given point on a given blade is the curvature of the given blade at the given point relative to a tangent line of a circle passing through the given point, the circle being centered on the axis of rotation of the improved impeller.

5. The air scrubbing system of claim 4 further wherein the first end curvature angle is 90 degrees.

6. The air scrubbing system of claim 1 further wherein the diameter of the impeller is between six and thirty inches.

7. The air scrubbing system of claim 1 further wherein the width of the impeller is between one-half inch and four inches.

8. The air scrubbing system of claim 1 further wherein the impeller has sixteen blades.

9. The air scrubbing system of claim 1 wherein the water supply is fresh water provided by an external source and configured to be supplied only when a motor configured to rotate the impeller around the axis of rotation is activated.

10. The air scrubbing system of claim 1 wherein the impeller housing is octagonal.

* * * * *